(12) United States Patent
Chon et al.

(10) Patent No.: US 8,714,217 B2
(45) Date of Patent: May 6, 2014

(54) NON-PNEUMATIC WHEEL ASSEMBLY AND WHEEL, SUSPENSION AND TIRE USED THEREIN

(76) Inventors: Young-Ill Chon, Cheonan-si (KR);
Soon-Ja Lee, Cheonan-si (KR);
Sun-Young Chon, Cheonan-si (KR);
Sang-Hyun Chon, Ansan-si (KR);
Sang-Wook Chon, Seoul (KR)

(*) Notice: Subject to any disclaimer, the term of this patent is extended or adjusted under 35 U.S.C. 154(b) by 675 days.

(21) Appl. No.: 12/742,914

(22) PCT Filed: Oct. 16, 2008

(86) PCT No.: PCT/KR2008/006120
§ 371 (c)(1), (2), (4) Date: Sep. 13, 2010

(87) PCT Pub. No.: WO2009/064075
PCT Pub. Date: May 22, 2009

(65) Prior Publication Data
US 2011/0248554 A1     Oct. 13, 2011

(30) Foreign Application Priority Data

Nov. 14, 2007  (KR) .................. 10-2007-0116002
Sep. 2, 2008   (KR) .................. 10-2008-0086428

(51) Int. Cl.
*B60B 9/04* (2006.01)

(52) U.S. Cl.
USPC .................. 152/74; 152/17; 152/247

(58) Field of Classification Search
USPC ............. 152/5–7, 11–12, 17–18, 31, 40, 42, 152/69–74, 80, 247, 258–259; 301/6.91
See application file for complete search history.

(56) References Cited

U.S. PATENT DOCUMENTS

| | | | | |
|---|---|---|---|---|
| 1,115,178 A * | 10/1914 | Davis, Sr. | ...................... | 152/80 |
| 1,120,156 A * | 12/1914 | Palmer | .................. | 152/31 |
| 1,399,670 A * | 12/1921 | Stranahan | .................. | 152/250 |
| 2,311,999 A * | 2/1943 | Purvis | ................... | 152/154.1 |
| 2,439,742 A | 4/1948 | Martin | | |
| 3,493,027 A * | 2/1970 | Dewhirst et al. | ................ | 152/11 |
| 4,026,342 A * | 5/1977 | Wormley | ................... | 152/18 |
| 4,067,374 A | 1/1978 | Alden et al. | | |
| 4,193,437 A | 3/1980 | Powell | | |
| 5,050,656 A | 9/1991 | Ho | | |
| 5,236,027 A * | 8/1993 | Lu | ................... | 152/250 |

(Continued)

FOREIGN PATENT DOCUMENTS

| EP | 1640184 A1 | 3/2006 |
|---|---|---|
| EP | 1902866 A1 | 3/2008 |

(Continued)

*Primary Examiner* — Jason Bellinger
(74) *Attorney, Agent, or Firm* — patenttm.us

(57) ABSTRACT

A non-pneumatic wheel assembly includes a wheel, a shock absorbing member coupled to an outer periphery of the wheel and absorbing or attenuating noise and vibration due to external shock, a plurality of resilient members arranged around and coupled to an outer periphery of the shock absorbing member in a radial direction and having a plurality of resilient rings that are resiliently deformed in response to an external force, resilient links respectively coupled to the resilient rings to evenly transmit external shock to the resilient rings, rail plates to which sliders formed at both ends of the resilient links are slidably coupled, and a tire having a plurality of coupling grooves formed along an inner periphery such that the rail plates are inserted into the coupling grooves.

23 Claims, 9 Drawing Sheets

(56) References Cited

U.S. PATENT DOCUMENTS

| | | | | |
|---|---|---|---|---|
| 5,353,853 | A * | 10/1994 | Hansson | 152/11 |
| 6,286,572 | B1 * | 9/2001 | Chen | 152/84 |
| 6,650,868 | B1 * | 11/2003 | Karabinis | 455/12.1 |
| 6,701,985 | B2 * | 3/2004 | Russell | 152/47 |
| 7,032,634 | B2 * | 4/2006 | Laurent et al. | 152/11 |
| 7,743,806 | B2 * | 6/2010 | Abe | 152/21 |
| 8,127,809 | B2 * | 3/2012 | Russell | 152/40 |

FOREIGN PATENT DOCUMENTS

| | | |
|---|---|---|
| JP | H09-058209 | 3/1997 |
| JP | 2008-074345 | 4/2008 |
| KR | 10-2004-7002607 | 2/2008 |
| WO | 03/018332 | 3/2003 |

* cited by examiner 10-1

10-1

200-1

NON-PNEUMATIC WHEEL ASSEMBLY AND WHEEL, SUSPENSION AND TIRE USED THEREIN

TECHNICAL FIELD

The present invention relates to a non-pneumatic wheel assembly, and more particularly, to a non-pneumatic wheel assembly for a vehicle, and a wheel, suspension, and tire used therein that are capable of ensuring driving stability because there is no air chamber between a wheel and a tire to blowout. They are also capable of ensuring good road holding, preventing standing waves, reducing brake fade and cornering force, providing good handling and ride comfort, staying quiet when rolling, and are economical and environmentally friendly.

BACKGROUND ART

Today's automobiles generally employ pneumatic wheels, in which a bead of a tire is sealed with a rim of the wheel to provide an inner space filled with air to a predetermined pressure such that the tire is expanded to form an annular shape appropriate for driving.

The tire of a pneumatic wheel maintains the shape of the wheel and provides a drive function and ride comfort using filled air pressure. Therefore, if the tire is pierced or damaged by a sharp object such as a nail or glass shard, or loses too much air pressure due to some other cause during operation of the vehicle, the annular shape of the wheel is likely to be deformed and lose its function. In more serious cases, a tire cord and rubber may be separated or cut causing the tire to be torn apart so that the vehicle becomes impossible to drive. When the vehicle is driven with a flat or torn tire, the expensive wheel, suspension, and so on, of the vehicle may be damaged. And at high speeds, serious accidents may occur.

U.S. Pat. Nos. 4,067,374 and 4,193,437 disclose a run-flat tire including reinforcing rings inserted into its sidewalls to support the weight of the vehicle and allow it to be driven a certain distance when flat, for the sake of drivers who are unable to change a flat tire, for example, the handicapped or women when a tire of a pneumatic wheel is flatted due to blowout. In addition to the reinforcing rings, the sidewalls of the run-flat tire have a large amount of rubber in order to prevent buckling when there is no air in the inner space. However, compression, shearing stress and heat imparted to the tire due to repeated loads during driving cause fatigue fractures in the sidewalls. In addition, the thick sidewalls, which aim at safety, reduce ride comfort.

A more advanced concept than the run flat tire is a non-pneumatic wheel, various types of which have been proposed to avoid tire blowout.

For example, U.S. Pat. No. 5,050,656 and Korean Patent Application No. 2004-7002607 disclose a "Non-Pneumatic Tire Wheel" and a "Non-Pneumatic Tire", respectively, which have been developed for the purpose of preventing blowout of the tire. However, since the tire employs plate-shaped spokes to absorb shock through yielding and reflecting movement, excessive noise and heat generated when driving the vehicle and relatively poor ride comfort in comparison with the pneumatic tire are obstacles to commercialization of the non-pneumatic tire.

In addition, Japanese Patent Laid-open Publication No. 2008-074345 discloses a non-pneumatic wheel including a plurality of link mechanisms between a tread of a tire and a rim of the wheel, and spring members interposed between the link mechanisms. However, since the link mechanisms and the spring members are formed as one integrated body, the tread can absorb only shock perpendicular to the road surface and does not properly absorb local shock.

Further, Japanese Patent Laid-open Publication No. H9-058209 discloses a wheel including a plurality of leaf springs mounted thereon, and rubber mounted on tips of the leaf springs. However, it is impossible for the wheel to stably maintain an annular shape like the pneumatic wheel, and a part that contacts the road cannot be optimally subdivided. Thus, noise due to shock is loud and ride comfort is reduced.

Meanwhile, an ultra high performance (UHP) tire having tread formed of a compound material manufactured by mixing various chemicals and rubber, rolling the mixture, and refining the mixture to increase road holding is coming into use. However, it is impossible to subdivide the tread according to function within the structure of the pneumatic wheel in which the tread is uniformly biased outward by air pressure.

Moreover, conventional wheels transmit friction and vibration noise from the tires through the vehicle body to the inside of the vehicle, thereby increasing noise inside the vehicle.

DISCLOSURE OF INVENTION

Technical Problem

In order to solve the foregoing and/or other problems, the present inventor(s) conducted several years of research into the development of a wheel capable of improving ride comfort, durability and road holding without tire blowout, preventing standing waves, improving vehicle performance by reducing brake fade and cornering force, reducing noise inside the vehicle, and reducing tire manufacturing cost. This research led to the conception and completion of the present invention.

The present invention is directed to a non-pneumatic wheel assembly that does not require injection of air and does not blowout.

The present invention is also directed to a non-pneumatic wheel assembly with improved ride comfort and driving stability.

The present invention is also directed to a non-pneumatic wheel assembly that enables tire manufacturing cost to be reduced.

The present invention is also directed to a non-pneumatic wheel assembly capable of maximizing radiation of heat from brakes and tires.

The present invention is also directed to a non-pneumatic wheel assembly capable of minimizing transmission of friction and vibration noise from tires via a vehicle body.

Technical Solution

One aspect of the present invention provides a non-pneumatic wheel assembly including: a wheel; a shock absorbing member coupled to an outer periphery of the wheel and absorbing or attenuating noise and vibration due to external shock; a plurality of resilient members arranged around and coupled to an outer periphery of the shock absorbing member in a radial direction and having a plurality of resilient rings that are resiliently deformed in response to an external force; resilient links respectively coupled to the resilient rings to evenly transmit external shock to the resilient rings; rail plates to which sliders formed at both ends of the resilient links are slidably coupled; and a tire having a plurality of coupling grooves formed along an inner periphery such that the rail plates are inserted into the coupling grooves.

Another aspect of the present invention provides a non-pneumatic wheel assembly including: a wheel; a plurality of leaf springs arranged around and coupled to an outer periphery of the wheel in a radial direction; resilient members respectively coupled to the leaf springs and resiliently deformed in response to an external force; resilient links coupled to the resilient members to evenly transmit external shock to the resilient members; rail plates to which sliders formed at both ends of the resilient links are slidably coupled; and a tire having a plurality of coupling grooves formed along an inner periphery such that the rail plates are inserted into the coupling grooves.

Still another aspect of the present invention provides a wheel having a plurality of air vents formed along an outer periphery of a rim.

Yet another aspect of the present invention provides a suspension for a non-pneumatic wheel assembly including: a plurality of resilient members arranged around and coupled to an outer periphery of the wheel in a radial direction and having a plurality of resilient rings that are resiliently deformed in response to an external force; resilient links respectively coupled to the resilient rings to uniformly transmit external shock to the resilient rings; and a rail plate to which sliders formed at both ends of the resilient links are slidably coupled.

Yet another aspect of the present invention provides a tire for a non-pneumatic wheel assembly including: a tread in contact with a road surface; shoulders formed at both sides of the tread to surround a suspension of the wheel; reinforcement cores inserted into the tread and the shoulders to maintain the shape and reinforce the strength of the tire; and a plurality of air vents formed along an outer periphery of the tread.

Advantageous Effects

As described above, since the present invention has no air chamber and requires no air injection, it is possible to prevent tire blowout even when the tire is pierced by a sharp object such as a nail or glass shard so that the driving performance of the tire is unaffected. Therefore, it is possible to reduce vehicle accidents caused by blowout of a pneumatic tire during driving of a vehicle. In addition, it is possible to prevent generation of heat caused by hysteresis loss (due to friction by deformation) of the tire from repeated deformation due to variation in air pressure, thereby enhancing safety and remarkably increasing the lifespan of the tire.

Further, unlike operation mechanisms of the conventional pneumatic wheel, since shock is absorbed and attenuated and vibration is diminished through a separate suspension means for evenly distributing a load, it is possible to provide convenient and optimized driving performance, good ride comfort and good handling performance under various road conditions.

Furthermore, since the tire of the present invention is constituted by a tread and shoulders only, it is possible to prevent deformation, fatigue and heat storage of the tire even while the vehicle is rapidly driving, thereby preventing standing waves of the tire. In addition, heat can be readily discharged from a plurality of air vents passing through the wheel and tire to prevent an increase in temperature around a portion where braking is applied, and heat radiation from a brake drum or disc is improved to minimize generation of brake fade of the tire.

Further, since a suspension of the present invention is constituted by a plurality of resilient rings that rapidly and flexibly absorb and attenuate an external force, it is possible to provide good driving, road holding and handling performance, without modification of the shape and structure of the tread of the tire. In particular, it is possible to provide excellent safety and ride comfort at high speeds.

Furthermore, a gasket of the present invention minimizes transmission of friction and vibration noise to a vehicle body to reduce noise inside the vehicle.

In addition, since there is no need to store a spare tire in a trunk of the vehicle, it is possible to increase available space and reduce fuel consumption. Further, there is no need to individually adjust tire pressure. Since it is possible to reduce consumption of raw materials and cut down on waste, there are economic and environmental advantages.

BRIEF DESCRIPTION OF THE DRAWINGS

The above and other objects, features and advantages of the present invention will be more apparent from the following detailed description taken in conjunction with the accompanying drawings, in which.

MODE FOR THE INVENTION

Exemplary embodiments of the present invention will now be described in detail with reference to the accompanying drawings.

Some terms used herein reflect functions and should be interpreted in light of the technical spirit of the present invention and common usage.

Further, when a description of functions or structures that are already known to those of skill in the art would detract from the clarity and concision of this disclosure, the description will be omitted.

Figure 1:
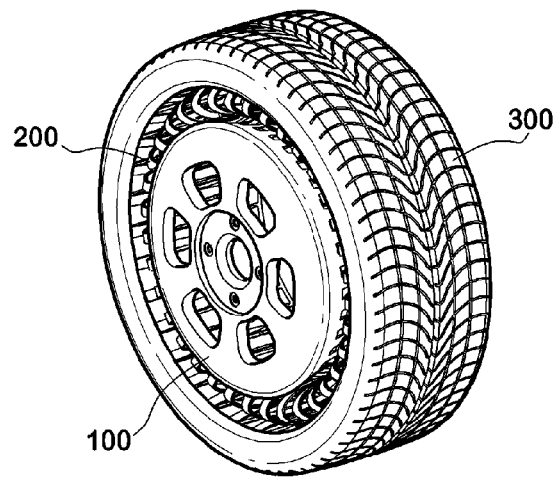
FIG. 1 is a perspective view of a non-pneumatic wheel assembly in accordance with a first exemplary embodiment of the present invention.
Figure 2:
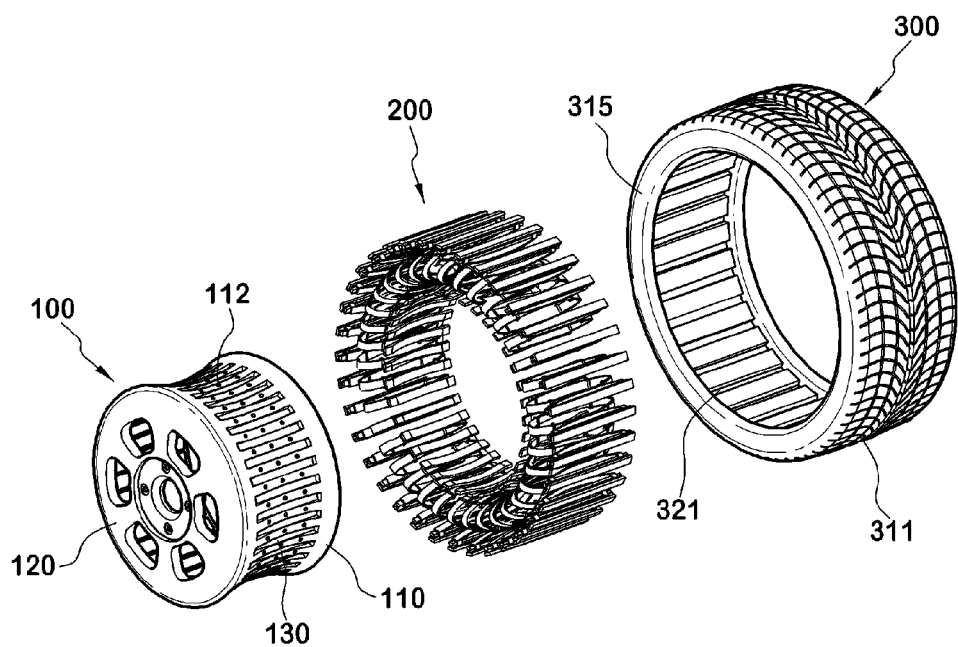
FIG. 2 is an exploded perspective view of FIG. 1.
Figure 3:
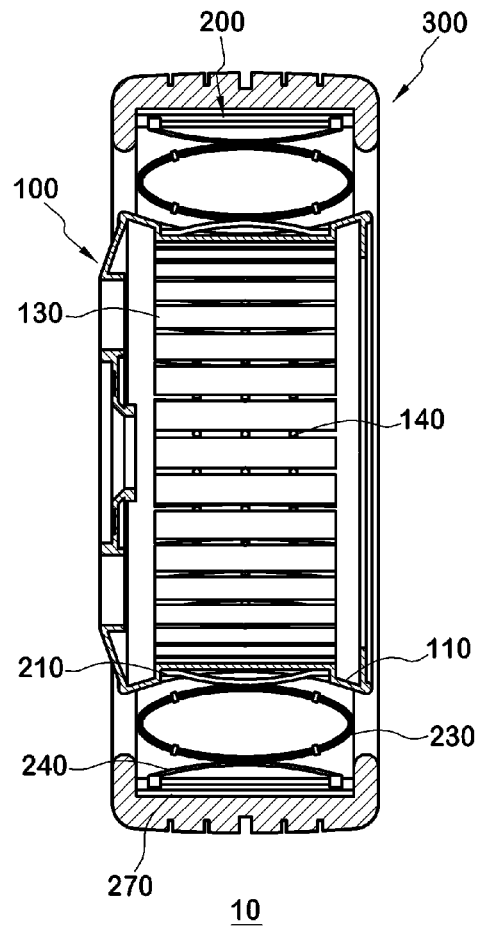
FIG. 3 is an enlarged side cross-sectional view of FIG. 1.

FIG. 1 is a perspective view of a non-pneumatic wheel assembly in accordance with a first exemplary embodiment of the present invention, FIG. 2 is an exploded perspective view of FIG. 1, and FIG. 3 is an enlarged side cross-sectional view of FIG. 1. As shown in FIGS. 1 to 3, the non-pneumatic wheel assembly 10 in accordance with a first exemplary embodiment of the present invention includes a wheel 100 coupled to an axle, a tire 300 in contact with a road surface, and a plurality of suspensions 200 installed between the wheel and the tire to absorb shock and vibration from the road surface while driving, thereby preventing transmission of shock to a vehicle body.

First, the wheel 100, which is coupled to the axle, includes a disc 120 coupled to a hub of the axle and a rim 110 coupled to the suspensions 200. A plurality of mounting grooves 130 are formed at an outer periphery of the rim 110 in a radial direction.

In addition, a plurality of air vents 112 are formed along an inner periphery of the rim 110 to rapidly discharge heat generated by friction between the tire 300 and the road surface, heat generated from the tire itself, and heat generated from a vehicle brake system.

Since the air vents 112 are used to remarkably improve heat radiation and cooling of a brake system that converts the kinetic energy of the vehicle into heat using friction to apply the brake, it is possible to effectively prevent brake fade due to friction heat, and so on.

Here, the wheel 100 may be implemented as a one piece in which the rim 110 and the disc 120 are formed as one integrated body, two pieces in which the rim 110 and the disc 120 are individually manufactured and coupled to each other by welding or some other techniques, or three pieces in which an outer rim, an inner rim, and a disc are individually manufactured and coupled to each other.

Of course, the wheel 100 may be implemented by a spoke wheel in which a boss and a rim are connected by a plurality of spokes, or a spider wheel having a plurality of rim supports formed at a boss in a radial direction.

The tire 300 is fitted onto an outer periphery of the wheel 100 to be integrally rotated therewith, to absorb shock from the road surface, and to adhere to the road surface to enable drive or brake of the vehicle. The tire 300 includes a tread 311 designed to hold the road in spite of slippery conditions or external shock and to stand up to wear and tear, shoulders 315 protecting coupling ends of the suspension and radiating heat during driving, and a plurality of coupling grooves 321 formed at a position corresponding to mounting grooves of the wheel 130 in a radial direction along an inner periphery of the tire.

In addition, the tread 311 of the tire 300 has various patterns of grooves for improving braking, driving, steering performance, stability, and cornering performance, preventing side slip, increasing heat radiation, and reducing noise.

Since the tire 300 also has a function of protecting the suspensions 200, the tire 300 may be a solid type in which the entire tire has good wear resistance and is formed of a rubber material.

A brake part formed of a multi-layered cord layer and rubber surrounding the cord layer is disposed inside the tire 300 to better absorb shock from the road surface and prevent damage to coupling ends of the suspensions 200.

As described above, the tire 300 is a way to overcome structural defects and problems of the conventional pneumatic tire. For example, when tire air pressure is insufficient, standing waves in the pneumatic tire abnormally increase and repulsion force of the tire decreases such that the rubber and tire cords suffer from fatigue and road holding deteriorates. However, since there is no need to inject air into the tire in accordance with the present invention, it is possible to overcome these and other limitations and disadvantages of the pneumatic tire.

Figure 4:
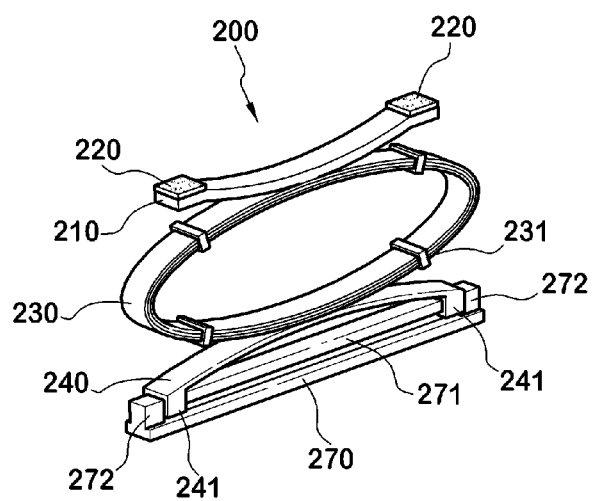
FIG. 4 is a perspective view of a suspension in accordance with a first exemplary embodiment of the present invention.

The plurality of suspensions 200 are installed between the wheel 100 and the tire 300 to absorb shock and vibration from the road surface while driving. As shown in FIG. 4, the suspension 200 in accordance with a first exemplary embodiment of the present invention includes a leaf spring 210 coupled to the mounting groove 130 of the wheel, a resilient member 230 coupled to the leaf spring 210 by a bolt or a clamp and resiliently deformed in response to an external force, a resilient link 240 coupled to the resilient member 230 by a bolt or a clamp and evenly transmitting shock applied from the tire to the resilient member, and a rail plate 270 having a guide rail 271 to which sliders 241 formed at both ends of the resilient link 240 are slidably coupled.

The leaf spring 210 is resiliently coupled to the mounting groove 130 formed at the wheel 100 to stably couple the suspension 200 to the wheel 100. The leaf spring 210 is resiliently deformed in response to an external force to absorb or attenuate shock and vibration.

Here, a shock absorbing member 220 may be further installed between the leaf spring 210 and the mounting groove 130 of the wheel to absorb vibration and reduce noise caused by external shock.

The resilient member 230, which is resiliently deformed in response to an external force to absorb shock and attenuate vibrations, is installed between the leaf spring 210 and the resilient link 240 to more securely fit the leaf spring 210 into the mounting groove 130 of the wheel and the rail plate 270 into the coupling groove 321 of the tire, using its resiliency.

Here, the resilient member 230 may be formed of a plurality of circular thin steel springs fixed by a plurality of clip bands 231, or may be formed in the shape of a circular or oval ring.

A width or a diameter of the resilient member 230 may narrow toward a center axis of the wheel 100.

The resilient link 240 is resiliently deformed in response to shock applied from the road surface to evenly transmit the shock to the resilient member 230. Arched sliders 241 are formed at both ends of the resilient link 240 to slide along the guide rail 271 of the rail plate and resiliently move in response to an external force in a horizontal direction.

The rail plate 270 is inserted into the coupling groove 321 of the tire to stably couple the suspension 200 to the tire 100 and absorb shock applied from the road surface. The rail plate 270 has a guide rail 271 for guiding the sliders 241 of the resilient link or sliders 261 of a sub link.

In addition, anti-separation thresholds 272 are formed at both ends of the guide rail 271 to prevent separation of the sliders 241 of the resilient link or the sliders 261 of the sub link.

The rail plate 270 may be formed of a flexible material that can absorb an external force to increase shock absorbing performance of the suspension 200, and both ends of the rail plate 270 are inserted into the tire 300 to be stably coupled to the tire without separating or moving due to an external force.

Since the non-pneumatic wheel assembly 10 in accordance with a first exemplary embodiment of the present invention can absorb and attenuate shock and vibration transmitted from the road surface through continuous resilient operations of the suspensions arranged at small intervals, it is possible to ensure a comfortable ride and remarkably improve steering stability when it is mounted on the vehicle.

Figure 5:
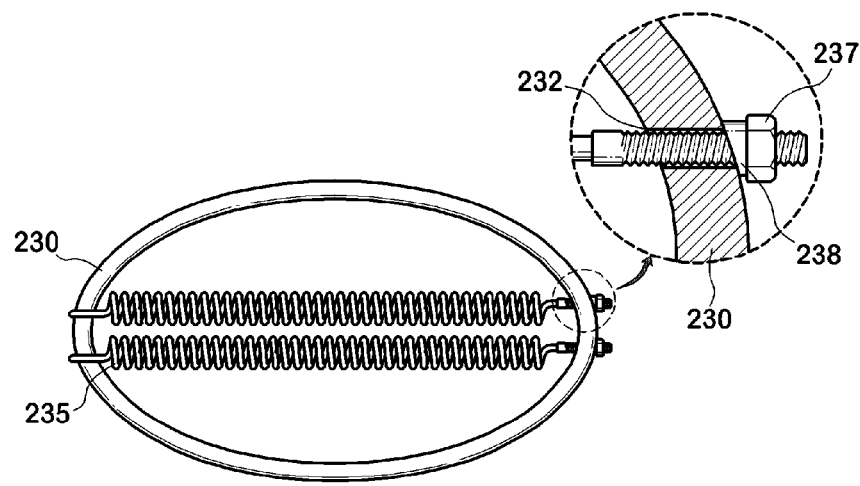
FIG. 5 is a front view of a resilient member in accordance with a second exemplary embodiment of the present invention.

FIG. 5 is a front view of a resilient member in accordance with a second exemplary embodiment of the present invention. As shown, tensile coil springs 235 are installed inside the resilient member 230 to reinforce a recovering force thereof.

The coil spring 235 may have a threaded part formed at its one end and the resilient member may have a through-hole 232 through which the threaded part is inserted and fastened by a nut 237 and a washer 238 to adjust a tension length of the spring.

Figure 6:
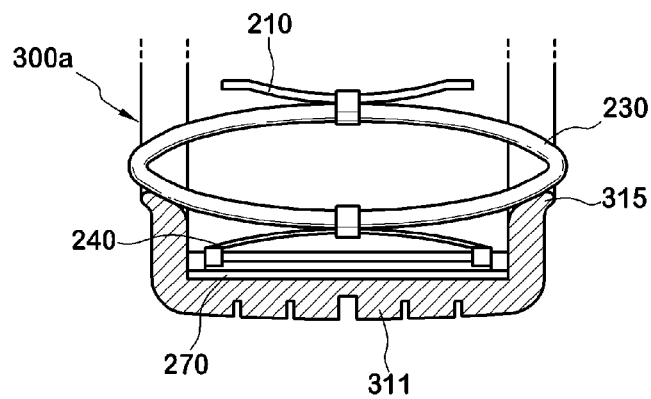
FIG. 6 is a partial side cross-sectional view of a tire in accordance with a third exemplary embodiment of the present invention.

FIG. 6 is a partial side cross-sectional view of a tire in accordance with a third exemplary embodiment of the present invention. As shown, shoulders 315 of a tire 300a have a shape that surrounds both ends of the resilient member 230 to be securely attached thereto to prevent introduction of foreign substances such as pebbles, and so on, into the tire 300a through a gap between the tire and the resilient member and to prevent abrupt deformation of the resilient member 230.

Since the shoulders 315 are in direct contact with both sides of the resilient member 230, they are formed of the same rubber material as a bead and a carcass of the pneumatic tire, having appropriate strength and structural integrity to stably surround and be attached to the resilient member.

Components of the tire 300a in accordance with a third exemplary embodiment of the present invention that have the same or similar effects as components in the first embodiment are designated by the same reference numerals as their corresponding components in their corresponding components in the first embodiment and will not be described again here.

Figure 7:
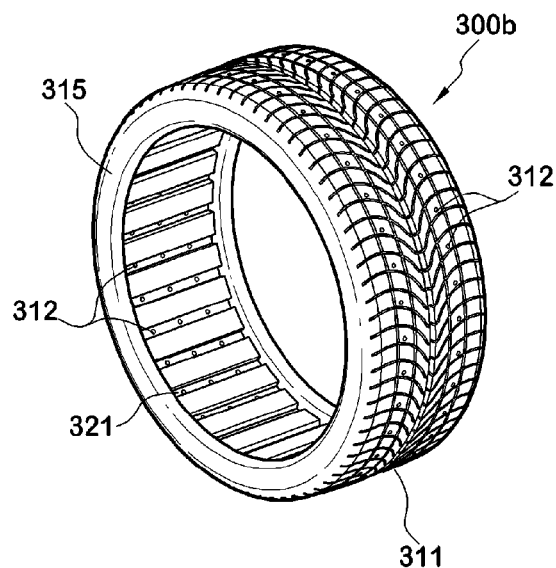
FIG. 7 is a perspective view of a tire in accordance with a fourth exemplary embodiment of the present invention.

FIG. 7 is a perspective view of a tire in accordance with a fourth exemplary embodiment of the present invention. As shown, a plurality of air vents 312 are formed along the periphery of a tire 300b to more smoothly and effectively radiate heat generated from the interior of the tire, and water is drained through the air vents to improve road holding and minimize hydroplaning when driving on a wet road surface. Therefore, it is possible to prevent vehicle accidents and serious damage to the tire due to friction heat with the road surface and heat generated from the tire itself, and to improve steering, braking, etc.

Components of the tire 300b in accordance with a fourth exemplary embodiment of the present invention that have the same or similar effects as components in the first or third embodiment are designated by the same reference numerals as their corresponding components in their corresponding components in the first or third embodiment and will not be described again.

Figure 8:
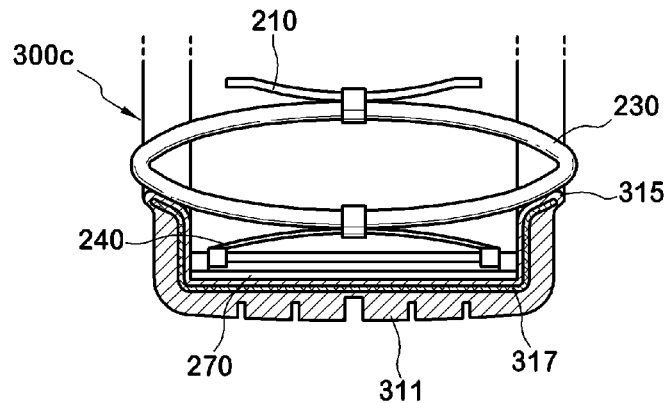
FIG. 8 is a partial side cross-sectional view of a tire in accordance with a fifth exemplary embodiment of the present invention.

FIG. 8 is a partial side cross-sectional view of a tire in accordance with a fifth exemplary embodiment of the present invention. As shown, a reinforcement core 317 is installed inside a tire 300c to maintain the shape of the tire and reinforce the strength thereof.

The reinforcement core 317 is formed of a metal net, a fiber net, high-strength steel, or the like, to attenuate shock applied from the exterior during driving of the vehicle, to prevent cracks or damage to the tread 311 and the shoulders 315 from reaching the rail plate 270 or the resilient member 230, and to widen an area of the tread 311 in contact with the road surface to increase driving stability of the vehicle.

Therefore, it is possible to maintain optimal road holding performance under a strong centripetal force and to provide good driving stability.

Components of the tire 300c in accordance with a fifth exemplary embodiment of the present invention that have the same or similar effects as components of the first, third or fourth embodiment are designated by the same reference numerals as their corresponding components in the first, third or fourth embodiment and will not be described again.

Figure 9:
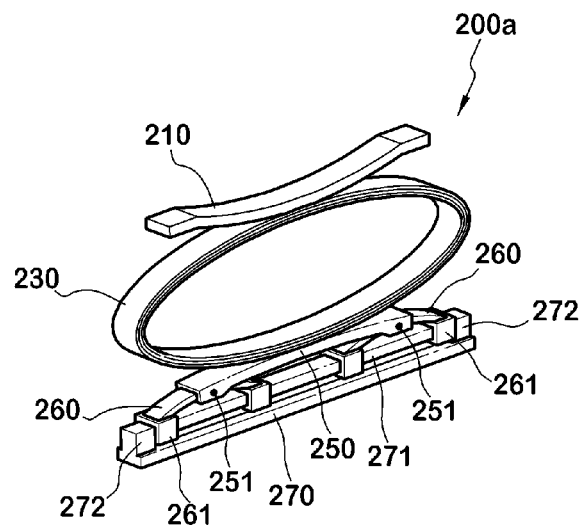
FIG. 9 is a perspective view of a suspension in accordance with a sixth exemplary embodiment of the present invention.

FIG. 9 is a perspective view of a suspension 200a in accordance with a sixth exemplary embodiment of the present invention. As shown, the suspension 200a includes a leaf spring 210 coupled to a mounting groove 130 of a wheel, a resilient member 230 coupled to the leaf spring and resiliently deformed in response to an external force, a main link 250 coupled to the resilient member to evenly transmit shock applied from the tire to the resilient member, sub links 260 coupled to both sides of the main link 250 by rotatable connecting pins 251 and having sliders 261 formed at both sides thereof, and a rail plate 270 having a guide rail 271 such that the sliders 261 are slidably coupled.

Another embodiment of the suspension 200a can primarily attenuate shock applied from the road surface using the sub link 260 and secondarily attenuate an external force applied through the sub link 260 to the resilient member 230 using the main link 250, thereby more rapidly and thoroughly dealing with an external force.

Components of the suspension 200a in accordance with a sixth exemplary embodiment of the present invention that have the same or similar effects as components of the first embodiment are designated by the same reference numerals as their corresponding components in the first embodiment and will not be described again.

Figure 10:
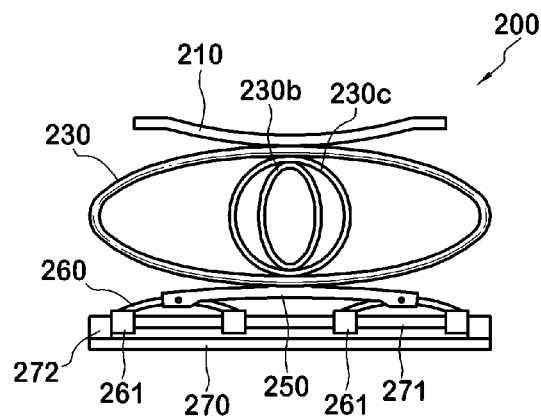
FIG. 10 is a front view of a resilient member in accordance with a seventh exemplary embodiment of the present invention.

FIG. 10 is a front view of a resilient member in accordance with a seventh exemplary embodiment of the present invention. As shown, a plurality of different resilient members 230b and 230c are consecutively installed in the resilient member 230.

That is, another resilient member 230b inserted into the resilient member 230 and still another resilient member 230c inserted into the resilient member 230b are continuously arranged and coupled to each other by a bolt, a clamp, or the like, to constitute a single coupling body.

Another embodiment of the resilient member 230 includes the plurality of resilient members 230, 230b and 230c to largely increase a resilient force to more securely and stably deal with the external force.

Figure 11:
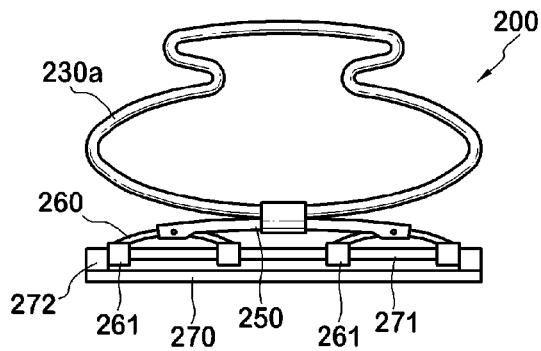
FIG. 11 is a front view of a resilient member in accordance with an eighth exemplary embodiment of the present invention.

FIG. 11 is a front view of a resilient member in accordance with an eighth exemplary embodiment of the present invention. As shown, an upper end of the resilient member 230a can be directly coupled to the mounting groove 130 of the wheel.

In another embodiment of the resilient member 230a, since the resilient member 230a is directly coupled to the mounting groove 130 of the wheel, it is possible to remarkably reduce manufacturing cost by alleviating the need for a separate component such as the leaf spring 210 and simplify an assembly process, thereby obtaining operation convenience and improving production efficiency.

Figure 12:
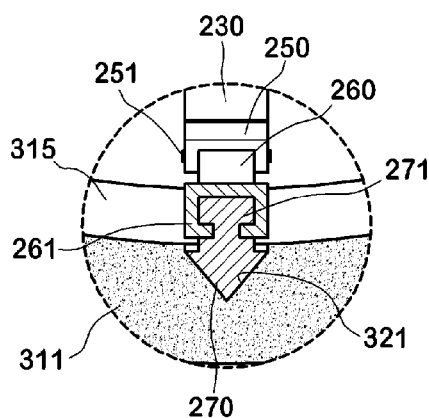
FIG. 12 is a partial side cross-sectional view of a non-pneumatic wheel assembly in accordance with a ninth exemplary embodiment of the present invention.
Figure 13:
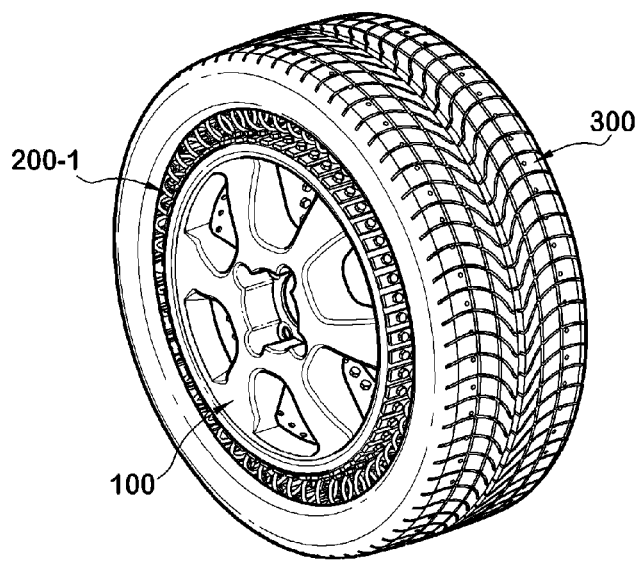
FIG. 13 is a perspective view of a non-pneumatic wheel assembly in accordance with a tenth exemplary embodiment of the present invention.
Figure 14:
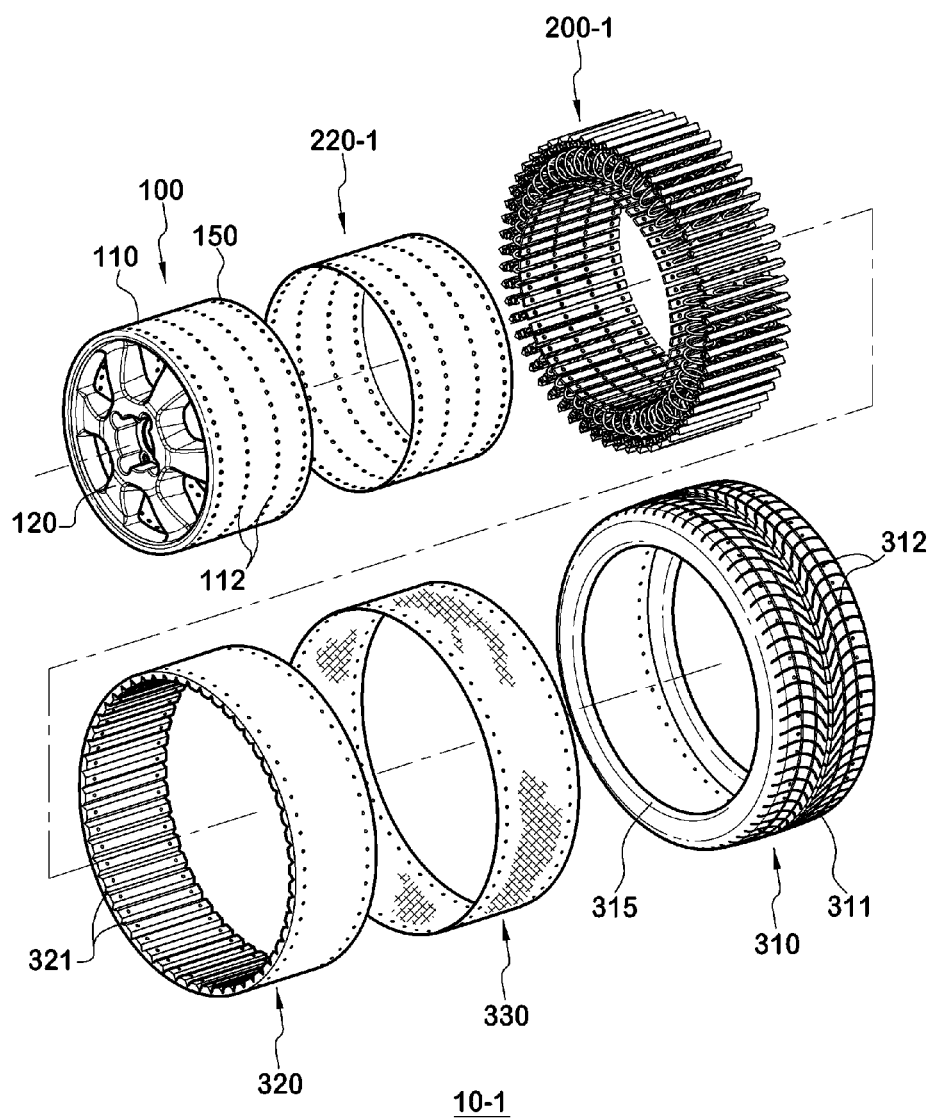
FIG. 14 is an exploded perspective view of FIG. 13
Figure 15:
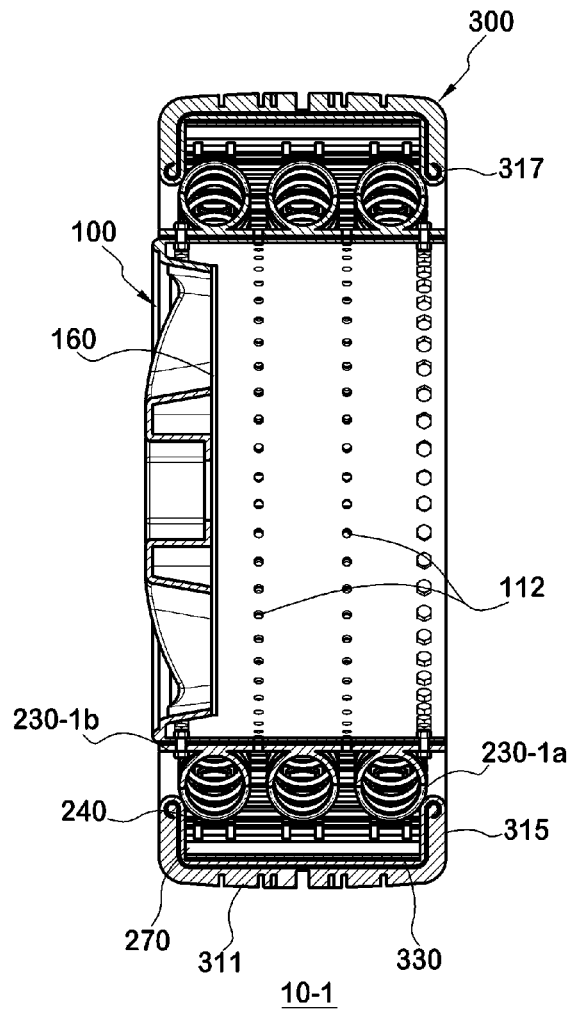
FIG. 15 is an enlarged side cross-sectional view of FIG. 13.
Figure 16:
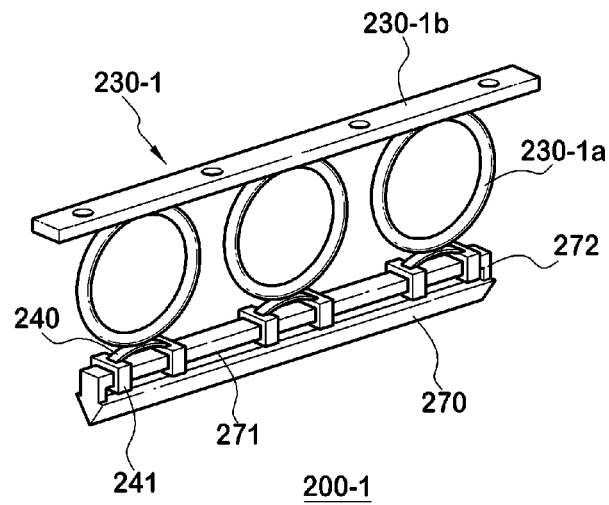
FIG. 16 is a perspective view of a suspension in accordance with a tenth exemplary embodiment of the present invention.

FIG. 12 is a partial side cross-sectional view of a non-pneumatic wheel assembly in accordance with a ninth exemplary embodiment of the present invention. As shown, a coupling groove 321 of a tire 300 has an inverted triangular shape, and a rail plate 270 of a suspension coupled to the coupling groove 321 also has a shape corresponding thereto.

The non-pneumatic wheel assembly in accordance with a ninth exemplary embodiment of the present invention enlarges a contact surface between the suspension 200 and the tire 300 to more stably and securely maintain coupling between them and thus remarkably enhance road holding.

Components of the non-pneumatic wheel assembly in accordance with a ninth exemplary embodiment of the present invention that have the same or similar effects as components of the first embodiment are designated by the same reference numerals as their corresponding components in the first embodiment and will not be described again.

FIGS. 13 to 16 show a non-pneumatic wheel assembly in accordance with a tenth exemplary embodiment of the present invention. The non-pneumatic wheel assembly 10-1 in accordance with a tenth exemplary embodiment of the present invention includes a wheel 100, a shock absorbing member 220-1, a tire 300, and a suspension 200-1 constituted by a resilient member 230-1, a resilient link 240, and a rail plate 270 and installed between the wheel 100 and the tire 300 to absorb shock and vibration from the road surface while driving and prevent its transmission to a vehicle body.

First, a plurality of coupling holes 150 are formed along an outer periphery of the wheel 100 to simultaneously couple the shock absorbing member 220-1 to the resilient member 230-1.

Similar to the first embodiment, the wheel 100 may have a plurality of mounting grooves 130 and air vents 112 formed along an outer periphery of a rim in a radial direction.

In addition, a gasket 160 may be attached to the inside of the disc of the wheel 100 to absorb and attenuate vibration and noise generated by friction between the tire and the road surface during driving of the vehicle, and to prevent transmission of heat from brakes, etc. to the wheel.

The gasket 160 may be formed of a rubber material having heat insulation properties and resiliency, or a felt material made up of densely woven fine fibers.

The shock absorbing member 220-1 is coupled to an outer periphery of the wheel 100 to absorb and attenuate noise and vibration caused by external shock, and is formed of a non-metallic material such as synthetic resin or polyurethane to form a cylindrical shape corresponding to an outer periphery of the wheel.

In addition, the shock absorbing member 220-1 also includes air vents and coupling holes formed along an outer periphery thereof on the same line as the air vents 112 and the coupling grooves 150 of the wheel 100.

A plurality of resilient members 230-1 are arranged along an outer periphery of the shock absorbing member 220-1 in a radial direction to absorb shock and attenuate vibration in response to an external force. In addition, a plurality of resilient rings 230-1a are formed at the inside thereof to be resiliently deformed in response to the external force.

The resilient ring 230-1a may be formed of a steel spring having a circular or oval ring shape, or any shape that is effective.

Figure 17:
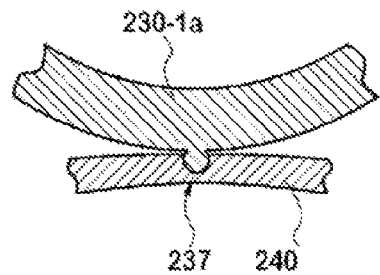
FIG. 17 is a partial front view of FIG. 16.

Further, as shown in FIG. 17, the resilient member 230-1 and the resilient link 240 may be coupled to each other through a connection means such as a ball joint or a universal joint to enable free rotation thereof in reciprocal and lateral directions.

Therefore, since the resilient member 230-1 flexibly and naturally deals with shock applied from the road surface by resiliently deforming to optimally convert shock absorption angle in reciprocal and lateral directions, it is more effective at absorbing and attenuating vibration from shock.

Here, the resilient member 230-1 may include a horizontal bar-shaped support body 230-1b having coupling holes coupled to the wheel and air vents for radiating heat, and a plurality of resilient rings 230-1a which are formed as one integrated body or are mounted separately from one another.

The resilient link 240 is resiliently deformed in response to shock applied from the road surface to evenly transmit the shock to the resilient member 230-1. The resilient link 240 has arcuate sliders 241 formed at both ends thereof slidably along the guide rail 271 of the rail plate to operate with resiliency appropriate to the intensity of an external force in a horizontal direction.

Figure 18:
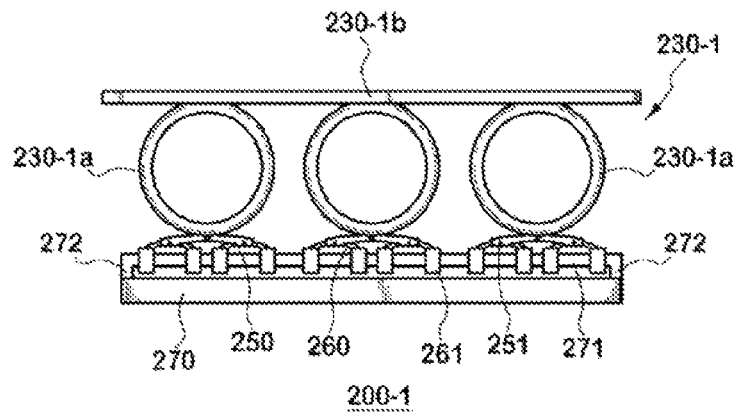
FIG. 18 is a front view of a suspension in accordance with an eleventh exemplary embodiment of the present invention.

Here, as shown in FIG. 18, the resilient link 240 may include a main link 250 coupled to the resilient ring 230-1 of the resilient member to evenly transmit shock applied from the exterior to the resilient ring, and sub links 260 coupled to both sides of the main link and having sliders 261 formed at both ends thereof.

That is, the sub links 260 primarily attenuate shock applied from the road surface, and the main link 250 secondarily attenuates an external force applied through the sub links 260 to the resilient member 230, thereby thoroughly, rapidly and flexibly dealing with the external force.

The rail plate 270 has a guide rail 271 inserted into the coupling groove 321 of the tire such that the resilient member 230-1 is stably coupled to the tire 300, absorbs shock applied from the road surface, and guides the sliders 241 of the resilient link or the sliders 261 of the sub links.

In addition, anti-separation thresholds 272 are formed at both ends of the guide rail 271 to prevent separation of the sliders 241 of the resilient link or the sliders 261 of the sub links.

Further, a lower end of the rail plate 270 has an inverted triangular shape and the tire 300 also has an inverted triangular coupling groove to enlarge a contact area and remarkably increase road holding, thereby more stably and securely maintaining the coupling relationship therebetween.

The rail plate 270 is formed of a resilient material that is flexibly deformed in response to an external force to largely increase shock absorption performance. In addition, both ends of the rail plate 270 are surrounded by the tire 300 to prevent separation and movement of the rail plate caused by the external force, thereby maintaining strong and stable coupling to the tire.

Here, the wheel 100 and the suspension 200-1 may be formed as one piece of a single body, or two pieces which are individually manufactured and coupled to each other by bolts, welding, or the like.

The tire 300 formed of a tread 311 and shoulders 315 absorbs shock applied from the road surface, and includes a plurality of coupling grooves 321 configured such that the rail plate 270 is inserted along an inner periphery of the tread 311 and a plurality of air vents 312 formed between adjacent coupling grooves 321.

In addition, a reinforcement core 317 formed of a super strong material is inserted into the tread 311 and the shoulders 315 to maintain the shape of the tire, reinforce its strength, and enhance stability at high speeds. Therefore, it is possible to endure a strong force applied outward from the vehicle when cornering.

Further, the tire 300 includes an auxiliary tire 320 having a plurality of coupling grooves 321 formed along an inner periphery thereof such that the rail plate 270 is inserted, and a main tire 310 detachably coupled to an outer periphery of the auxiliary tire. As a result, it is possible to more rapidly and readily couple the suspension 200-1 to the tire 300. In addition, when the tire is worn down, only the main tire need be replaced, thereby minimizing consumption of resources which is both environmentally and economically advantageous. Further, the tire can be readily manufactured to look good, and inexpensive general tires can exhibit ultra high performance.

Furthermore, a high density nylon cover is installed in the auxiliary tire 320 to improve durability of the tire at high speeds.

In addition, a shock absorbing member 330 may be mounted between the auxiliary tire 320 and the main tire 310 to absorb shock or vibration from the road surface and evenly distribute a load or pressure concentrated at any one point of the tire.

The shock absorbing member 330 may be formed of carbon nanotubes, which have good physical, chemical and optical characteristics, improve mechanical properties and heat resistance to protect the tire from external shock and heat, and suppress thermal damage and noise to obtain good shock absorbing performance.

Here, a carbon nanotube is a tube-shaped molecule formed by rolling a graphite sheet formed of carbons connected in a hexagonal ring shape and has a diameter of several to several tens of nanometers.

As is well known, carbon nanotubes have high strength, high flexibility, high durability, good lubrication, and a large surface area compared to volume, such that they are not damaged and worn even after repeated use. In addition, carbon nanotubes are chemically stable and have good thermal and electrical characteristics for various applications such as an electromagnetic absorbent, an antistatic agent, a field emission device, a semiconductor device, a gas and bio sensor, a fuel cell, a hardener, and so on. Further description of carbon nanotubes will be omitted.

Components of the non-pneumatic wheel assembly in accordance with tenth and eleventh exemplary embodiments of the present invention that have the same or similar effects as components of the first embodiment are designated by the same reference numerals as their corresponding components in the first embodiment and will not be described again.

When the non-pneumatic wheel assembly 10-1 in accordance with a tenth exemplary embodiment of the present invention is assembled, first, the wheel 100 and the suspension 200-1 are coupled to each other through coupling holes formed at both ends of the resilient member 230-1 and coupling holes formed along an outer periphery of the wheel 100 using vibration bolts and vibration nuts, which do not come loose from vibration. Then, an outer periphery of the rail plate 270 or the auxiliary tire 320 is tightened toward a center axis of the wheel using a conventional fastening band for fastening an object by reducing the circumferential length of the band when bolts are fastened, thereby more conveniently attaching or detaching the wheel 100, the suspension 200-1 and the tire 300.

Figure 19:
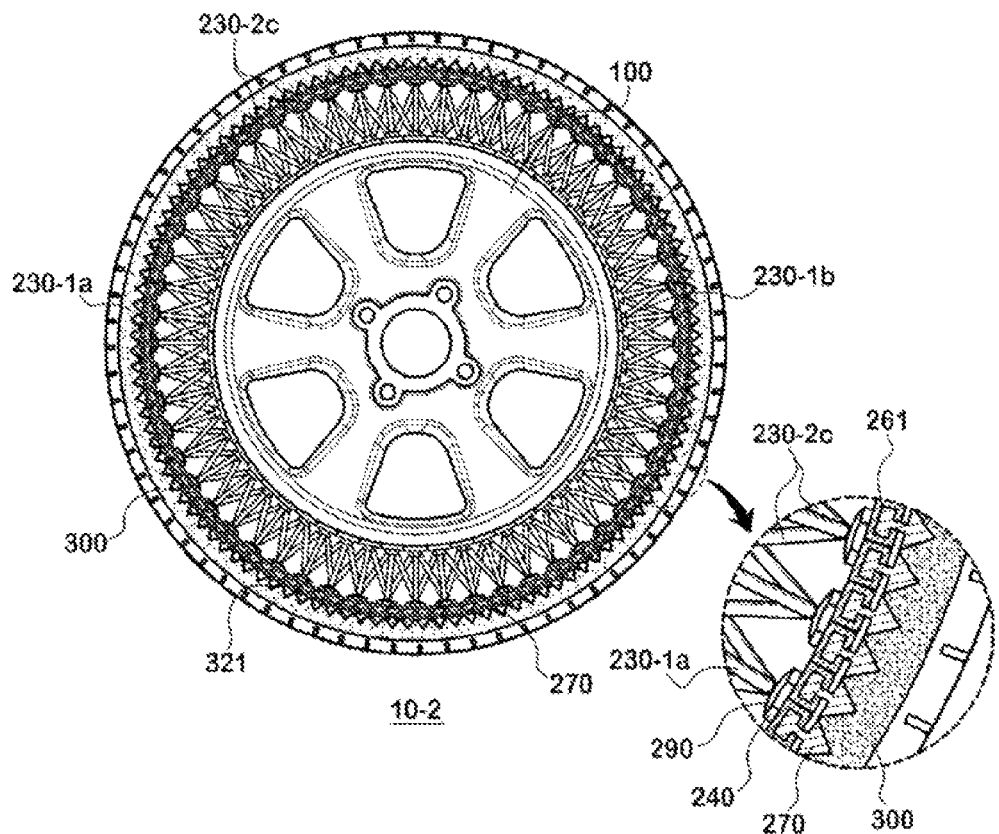
FIG. 19 is a front view of a non-pneumatic wheel assembly in accordance with a twelfth exemplary embodiment of the present invention.

FIG. 19 is a front view of a non-pneumatic wheel assembly in accordance with a twelfth exemplary embodiment of the present invention. In the non-pneumatic wheel assembly 10-2 in accordance with a twelfth exemplary embodiment of the present invention, auxiliary resilient rings 230-2c are coupled to both sides of the resilient ring 230-1a of the resilient member to be interlocked with the plurality of resilient links 240 and the rail plate 270 via a single connection link 290, and the auxiliary resilient rings 230-2c are coupled to support bodies 230-1b of adjacent resilient members.

That is, the resilient member 230-2 having auxiliary resilient rings 230-2c at both sides of the resilient ring 230-1a is coupled to an upper center of the connection link for connecting the plurality of resilient links 240 or the main links 250 to each other. The auxiliary resilient rings 230-2c of the resilient member have different diameters or arcs such that they are disposed to cross auxiliary resilient rings of other adjacent resilient members to be coupled to the other support bodies 230-1b adjacent to the ends thereof.

Here, the support bodies 230-1b of the resilient member 230-2 may be formed as one integrated body to be simultaneously inserted into an outer side of the wheel.

Figure 20:
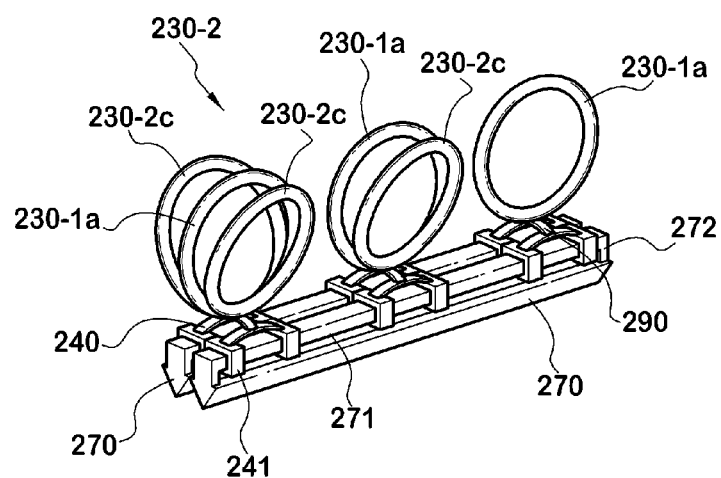
FIG. 20 is a perspective view of a suspension in accordance with a twelfth exemplary embodiment of the present invention.

In addition, as shown in FIG. 20, in the plurality of resilient rings 230-1a formed at the resilient member 230-2 in a width direction of the wheel, the resilient ring disposed at an outside of the wheel has auxiliary resilient rings 230-2c formed at both sides thereof, and the resilient ring disposed at an inside of the wheel has no auxiliary ring. That is, different numbers of the auxiliary resilient rings 230-2c are disposed at one resilient link 240 or one connecting link 290 in one direction of the tire width in a gradual manner to prevent the tire from bending or being unevenly worn when the vehicle corners.

Components of the non-pneumatic wheel assembly in accordance with a twelfth exemplary embodiment of the present invention that have the same or similar effects as components of the first embodiment are designated by the same reference numerals as their corresponding components in the first embodiment and will not be described again.

The non-pneumatic wheel assembly 10-2 can provide good cushioning and reaction against various shocks, such as vertical shock applied from the road surface and inclined shock applied in an inclined direction with respect to the rail plate 270 during rotation of the wheel, and conditions using the rail plate 270 to appropriately and evenly absorb the shock and uniformly distribute the load, thereby minimizing driving noise from the wheel.

While a few exemplary embodiments of the present invention have been shown and described, it will be appreciated by those skilled in the art that various changes may be made to these embodiments without departing from the spirit and scope of the invention as defined by the appended claims and their equivalents.

The invention claimed is:

1. A non-pneumatic wheel assembly comprising:
   a wheel;
   a plurality of resilient members arranged around and coupled to an outer periphery of the wheel in a radial direction and resiliently deformed in response to an external force;
   resilient links respectively coupled to the resilient members to evenly transmit external shock to the resilient members;
   rail plates to which sliders formed at both ends of the resilient links are slidably coupled; and
   a tire having a plurality of coupling grooves formed along an inner periphery such that the rail plates are inserted into the coupling grooves.

2. A non-pneumatic wheel assembly comprising:
   a wheel;
   a plurality of leaf springs arranged around and coupled to an outer periphery of the wheel in a radial direction;
   resilient members respectively coupled to the leaf springs and resiliently deformed in response to an external force;
   resilient links coupled to the resilient members to evenly transmit external shock to the resilient members;
   rail plates to which sliders formed at both ends of the resilient links are slidably coupled; and
   a tire having a plurality of coupling grooves formed along an inner periphery such that the rail plates are inserted into the coupling grooves.

3. The non-pneumatic wheel assembly according to claim 1 or 2, wherein the resilient member further comprises a tensile coil spring installed therein to reinforce a shape recovering action of the resilient member.

4. The non-pneumatic wheel assembly according to claim 3, wherein the coil spring has an adjustable tensile length.

5. The non-pneumatic wheel assembly according to claim 1 or 2,
wherein said resilient members comprise a plurality of resilient rings that are resiliently deformed in response to the external force;
and said resilient links are respectively coupled to the resilient rings to evenly transmit external shock to the resilient rings.

6. The non-pneumatic wheel assembly according to claims 1 or 2, further comprising a shock absorbing member coupled to the outer periphery of the wheel and absorbing or attenuating noise and vibration due to external shock;
said resilient members coupled to an outer periphery of the shock absorbing member in a radial direction and having a plurality of resilient rings that are resiliently deformed in response to an external force;
said resilient links respectively coupled to the resilient rings to evenly transmit external shock to the resilient rings.

7. The non-pneumatic wheel assembly according to claim 6, wherein the shock absorbing member has a plurality of air vents.

8. The non-pneumatic wheel assembly according to claim 5, wherein the resilient member is rotatably coupled to the resilient link.

9. The non-pneumatic wheel assembly according to claim 5, wherein the resilient link comprises auxiliary resilient rings disposed at both sides of the resilient ring to be interlocked with one resilient link, and the auxiliary resilient rings are arranged to cross other auxiliary resilient rings adjacent thereto.

10. The non-pneumatic wheel assembly according to claim 9, wherein different numbers of the auxiliary resilient rings are installed at one resilient link along the resilient ring in a width direction of the tire.

11. The non-pneumatic wheel assembly according to claim 9, wherein the resilient ring is installed to be interlocked with a plurality of rail plates.

12. The non-pneumatic wheel assembly according to claim 1, wherein the wheel has a plurality of mounting grooves formed along an outer periphery of the wheel in which the resilient member is inserted.

13. The non-pneumatic wheel assembly according to any one of claims 1, or 2, wherein the wheel comprises a gasket installed inside a disc to block transmission of noise and heat.

14. The non-pneumatic wheel assembly according to claim 1 or 2, wherein the resilient member is a leaf spring shaped like a circular ring, an oval ring, or an annulus.

15. The non-pneumatic wheel assembly according to claim 1 or 2, wherein the resilient member is integrally formed with a plurality of other resilient members disposed inside itself.

16. The non-pneumatic wheel assembly according to any one of claims 1, or 2, wherein the resilient link comprises:
a main link coupled to each of the resilient members to evenly transmit external shock to the resilient member; and
sub links coupled to both sides of the main link and having sliders formed at both ends thereof.

17. The non-pneumatic wheel assembly according to any one of claims 1, or 2, wherein a plurality of air vents are formed along an outer periphery of any one or all of the wheel and the tire.

18. The non-pneumatic wheel assembly according to any one of claims 1, or 2, wherein the tire comprises a tread and shoulders that surround side surfaces of the resilient member or the resilient ring.

19. The non-pneumatic wheel assembly according to claim 18, wherein the tire comprises a reinforcement core disposed therein that maintains the shape and reinforces the strength of the tire.

20. The non-pneumatic wheel assembly according to any one of claims 1, or 2, wherein the tire comprises:
an auxiliary tire having a plurality of coupling grooves formed along an inner periphery thereof such that the rail plates are inserted; and
a main tire detachably coupled to an outer periphery of the auxiliary tire.

21. The non-pneumatic wheel assembly according to claim 20, wherein the tire further comprises a shock absorbing member disposed between the auxiliary tire and the main tire to absorb shock or vibration from a road surface.

22. A suspension for a non-pneumatic wheel assembly according to claims 1 or 2, the suspension comprising said plurality of resilient members having a plurality of resilient rings that are resiliently deformed in response to the external force; and
said resilient links respectively coupled to the resilient rings to uniformly transmit external shock to the resilient rings.

23. The non-pneumatic wheel assembly according to claim 2, wherein the wheel has a plurality of mounting grooves formed along an outer periphery of the wheel in which the leaf springs or the resilient members are inserted.

* * * * *